United States Patent [19]
>
> Drake et al.
>
> [11] 4,066,417
>
> [45] Jan. 3, 1978

[54] SOLID-FLUID CONTACTING APPARATUS

[75] Inventors: Charles A. Drake; Glyndal D. Cowan, both of Bartlesville, Okla.

[73] Assignee: Phillips Petroleum Company, Bartlesville, Okla.

[21] Appl. No.: 682,933

[22] Filed: May 4, 1976

[51] Int. Cl.$^2$ ............................ B01J 8/00; B67D 5/58
[52] U.S. Cl. .................................... 23/289; 23/288 R; 222/189
[58] Field of Search ............... 23/288 R, 289, 267 R, 23/267 F, 290; 210/425, 427; 222/189

[56] References Cited

U.S. PATENT DOCUMENTS

| | | | |
|---|---|---|---|
| 2,526,651 | 10/1950 | Garbo | 260/449.6 |
| 3,012,024 | 12/1961 | Kavesh | 23/289 X |
| 3,193,103 | 7/1965 | Snyder | 210/427 X |
| 3,356,729 | 12/1967 | Denton et al. | 23/289 X |
| 3,410,791 | 11/1968 | Perry et al. | 23/289 X |

Primary Examiner—Morris O. Wolk
Assistant Examiner—Roger F. Phillips

[57] ABSTRACT

In a batch process in which fluid is contacted with solid particles in a vessel and withdrawn therefrom through a passageway, the passageway is provided with filtering means to prevent solid particles from escaping. The next batch of feed is introduced into the vessel through the same passageway causing displacement of the particles retained by the filtering means and carrying them back into the contacting zone of the vessel.

1 Claim, 1 Drawing Figure

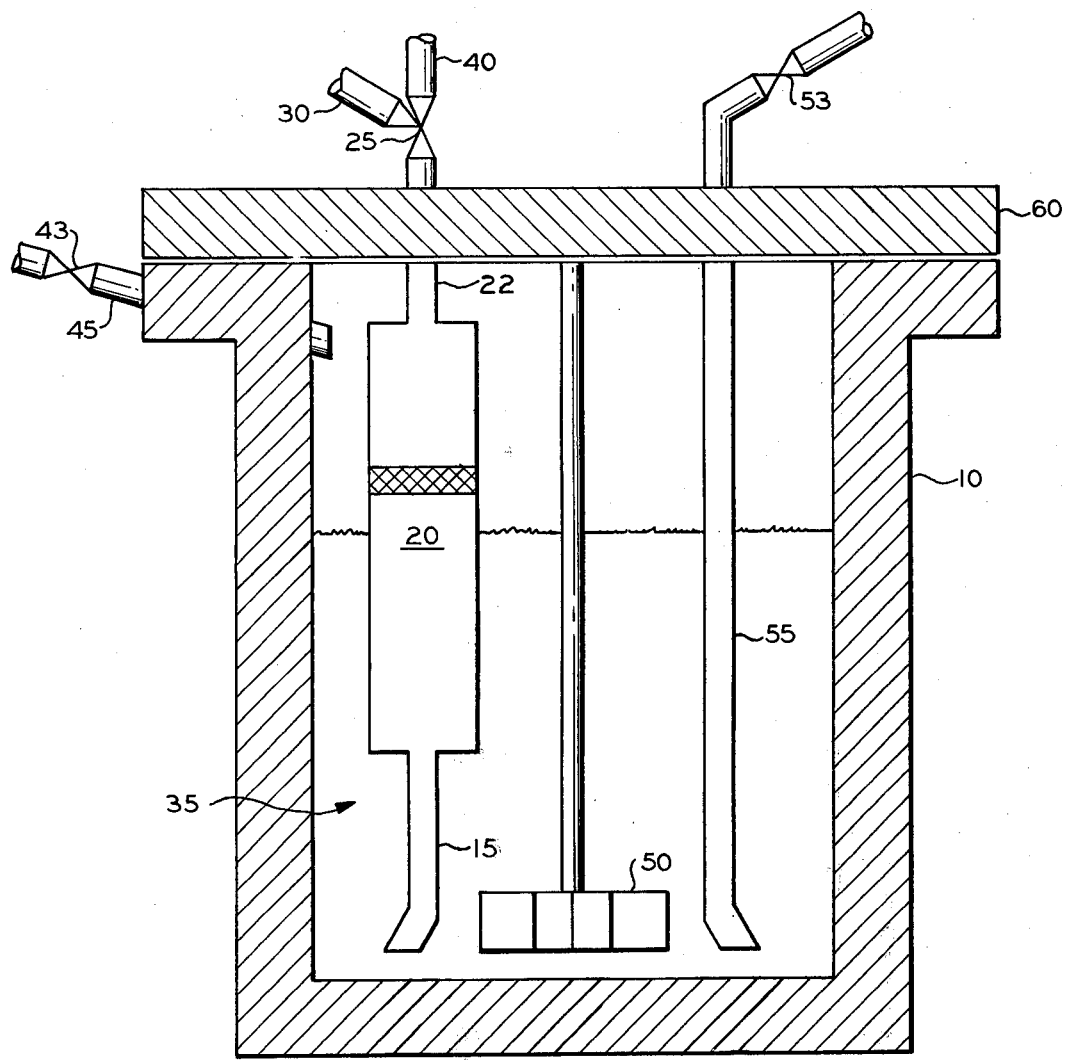

SOLID-FLUID CONTACTING APPARATUS

BACKGROUND OF THE INVENTION

This invention relates to solid-fluid contacting. In particular, it relates to solid-fluid contacting carried out in a batch system wherein solid particles are contacted with at least two batches of fluid.

In many batch processes requiring contacting fluid with solid particles, some of the solid particles remain active after processing of the first batch or even after processing several batches; consequently, it is often advantageous to reuse these solid particles in subsequent batches. The majority of solid-fluid contacting operations are most efficient when the contact surface, between the fluid and the solid particles, is at its maximum and when the solid particles are dispersed uniformly throughout the fluid. Since the maximum contact surface is achieved by using solid particles of smallest possible sizes, a difficulty arises in removing such small sized particles uniformly dispersed throughout the fluid. One way to accomplish removal is to withdraw the fluid together with the solid particles carried therein, then outside the vessel separate solids from the fluid. Another method is to provide a filter or a screen in the exit conduit of the vessel to allow the fluid but not the solid portion of the mixture to leave the vessel. This approach is marred by one difficulty — the solid particles become retained by or embedded in the screen or filter. The retained particles become unavailable for contacting with subsequent batches of feed and they gradually accumulate on the filter causing the filter to become plugged to such an extent that it must be removed and replaced, disrupting the continuity of the batching process and resulting in increasing the cost of the process.

The present invention obviates some of the problems in batch solid-fluid contacting processes by providing an improved method and apparatus for carrying out such contacting.

Thus, one object of the invention is to provide a more efficient solid-fluid contacting process and apparatus.

Another object of the invention is to make the processes for contacting fluid with solid particles more efficient by eliminating interruptions due to cleaning of filter means.

Still another object of the invention is to reuse solid particles contacted with one batch of fluid without additional steps of separating the solid particles from the fluid outside the vessel and replacing them into the vessel for processing of subsequent batches.

A still further object of the invention is to reduce the operational and maintenance costs of the solid-fluid contacting processes in which some of the solid particles are reuseable.

Still another object of the invention is to make it economically possible to reuse some of the solids in the batch solid-fluid contacting processes.

A still further object of the invention is to simplify the batch processes for contacting of solids with fluids in which at least some solids are reuseable and to reduce the size and complexity of the equipment.

Still another object of the invention is to provide an improved batch process for reacting fluids in the presence of a solid catalyst, where the products are withdrawn from the reaction zone but the catalyst is retained therein for processing a subsequent batch of feed.

Other objects of the invention will become apparent to those skilled in the art upon studying this specification and the appended claims.

SUMMARY OF THE INVENTION

One aspect of the invention is to utilize the same filter containing passageway of a vessel for entrance and exit of the fluid so that fluid entering the vessel causes displacement of particles, retained by the filter means when fluid of the previous batch is withdrawn, and causes them to be carried to the contacting zone of the vessel.

Another aspect of the invention is to introduce a batch of fluid ingredients which are to be reacted with each other or one another in the presence of a catalyst contained in a vessel, through the same passageway containing filter means through which the previous batch of fluid ingredients was withdrawn so that inflowing fluids dislodge and carry back at the time the previous batch of fluid was withdrawn.

Other aspects of the invention will become apparent to those skilled in the art upon studying this disclosure.

BRIEF DESCRIPTION OF THE DRAWING

FIG. 1 shows a side elevational section of the apparatus used in connection with the present invention.

DETAILED DESCRIPTION OF THE INVENTION

Consecutive batches of fluid feed, which are contacted with solid particles contained in a vessel, are introduced into the vessel and withdrawn therefrom through the same passageway containing a filter means. As the filter means prevents solid particles from being carried away from the vessel in the exiting fluid, some of the solid particles become retained therein. The subsequent batch of feed is introduced into the vessel through the same passageway. The inflowing fluid, passing through the filter means in the opposite direction from the direction of the withdrawn fluid, dislodges the particles retained by the filter means and carries them back into the contact zone of the vessel. This procedure can be used for as long as the solid particles remain active for whatever purpose they are being contacted with the fluid. If some of the particles remain active while others are spent, additional solid particles can be added to keep the amount of active solid particles at the desired level.

The invention is applicable to any batch process that utilizes solid-fluid contacting in which it is desirable to use at least some of the solid particles for contacting with more than one batch of fluid. Any filtering means suitable for preventing at least a substantial portion of particles from being carried out of the vessel by the exiting fluid can be utilized. In most applications, it is preferable, however, to use for that purpose a filter or a screen of mesh size sufficient to retain at least a substantial portion of particles. Similarly, the invention is not limited to the use of any particular feed as long as it is a fluid, whether liquid or gas, capable of passing through the filter means. The product formed must also be fluid capable of being withdrawn through the filter means. It is not crucial that the by-products of the reaction be capable of passing through the filter means as long as these compounds do not interfere with the processing of subsequent batches of feed. Also, the successive batches of feed can be physically and chemically the same or be different from each other.

The solid particles can be of any desired size and shape and can be made of any suitable material; the particles can react with the fluid, be used as a catalyst, or act for any other desired purpose. It is irrelevant, for the purpose of this application, whether the specific density of the solid particles is less than, equal to, or greater than the specific density of the fluid with which particles are contacted. The vessel in which the contacting step takes place, can be of any size and shape. It can be an open-top or a closed vessel; it can contain a stirrer or any other means for agitating fluid brought in contact with solid particles and any other ingredients that can be introduced into the contacting zone of the vessel. One application of the present invention of special importance in commercial processes is to batch catalyst processes, especially slurry-type processes in which the catalyst in the form of solid particles is suspended in the fluid reaction medium.

An example of a batch catalyst process is batch hydrogenation carried out in an autoclave-type reactor. Referring now to FIG. 1, the particles of a hydrogenation catalyst, Raney nickel catalyst, for example, remain active after processing of the first batch, consequently, after contacting step of the process is completed it is desirable to withdraw the fluid but retain the catalyst for further processing. The fluid is withdrawn from vessel 10 through the dip tube 15, filter 20, lower conduit 22, valve 25 and exit conduit 30. The filter 20 inside the dip tube 15 prevents the Raney nickel catalyst, dispersed in the fluid, from being carried therewith from the vessel 10. Some of the solid particles carried by the exiting fluid are retained by the filter 20 during the removal of the fluid. These are dislodged and brought back into the contacting zone 35 by the incoming fluid of the subsequent batch. The inflowing fluid flows through the upper tube 40, through the valve 25, lower conduit 22, filter 20 and the dip tube 15 into the contact zone 35. The fluid passing downward through the filter 20 displaces solid particles that are retained thereby and carries the particles with it.

If needed, gases can be introduced into vessel 10 through gas feed port 45 by opening valve 43. The ingredients to be contacted can be blended together by means of a stirrer 50. If additional catalyst is needed to replace some of the spent catalyst, valve 53 is opened and fresh catalyst introduced through the catalyst dip tube 55. This sequence of steps can be repeated until most of the catalyst is exhausted or until exhausted catalyst interferes with the reaction rate or occupies so much space in the vessel 10 to necessitate its removal. If a complete removal of catalyst is desired, the vessel cover 60 is lifted and the catalyst taken out. Periodic removal of substantial portion of catalyst can be accomplished by introducing through upper conduit 40, lower conduit 22, the filter 20 and dip tube 15, a flush liquid. The liquid can then be blended with the catalyst using stirrer 50 to form a slurry which is withdrawn through the catalyst dip tube 55. For the next batch of feed, the new catalyst is introduced through the catalyst dip tube 55. The other ingredients are introduced as described, and the batch operation is resumed.

Other examples of processes to which the method and apparatus of this invention can be applied include catalytic oligomerization of olefins to make dimers, trimers and other polymers and catalytic disproportionation of olefins.

Many modifications will become apparent to those skilled in the art upon studying this disclosure. For example, the filter in the specific embodiment was placed inside the dip tube. In other applications, it can be desirable to place the filter in a different location such as in a passageway on the bottom of the vessel, in the top, or in the side thereof.

The following example is provided merely to illustrate the practice of the invention; it is not intended to limit the scope of the invention in any way.

EXAMPLE

A 1 liter vessel 10 shown in FIG. 1 was charged with the following ingredients:
200 g of a mixture of dinitriles
($C_{10}H_{14}N_2$) mainly

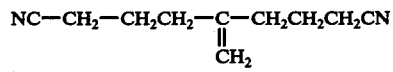

20 g Water
15 g Raney Nickel hydrogenation catalyst, chromium promoted.

The first three ingredients were introduced directly into the contacting zone 35, by placement into the open vessel.

The cover 60 was closed; the vessel 10 was flushed with nitrogen and 100 grams of anhydrous ammonia gas introduced into the vessel 10 through the gas feed port 45 to prevent formation of heavy by-products in the reaction. A sufficient amount of hydrogen was then passed into the vessel through the gas feed port 45 to bring the pressure inside the vessel 10 to 1500 psig. The reactants were then blended with the stirrer 50 and the reaction allowed to proceed undisturbed until the pressure fell to 950 psig. Additional hydrogen was then introduced into the gas feed port 45 to bring the pressure inside the vessel 10 to 1470 psig. This repressurization procedure was repeated two more times before the reaction came to completion one hour after it was commenced. The maximum temperature of the reaction products during operation was 198° F (92° C). Next, the gaseous products were vented through the gas feed port 45 and the liquid products were removed through the filter dip tube 15. The filter 20 (a cartridge type) in the filter dip tube 15 prevented any catalyst from being carried away by the exiting fluid products. The final product, namely 5-methyl-1,9-nonanediamine was visually inspected and was found to be clear and free from catalyst particles.

The vessel 10 was recharged by introduction of the next batch of reactants (dinitrile, water, and ammonia) through the upper conduit 40, the valve 22, the filter 20 and the filter dip tube 15 and another run was made following the same procedure. A total of four batch hydrogenations were carried in an eight hour day without opening the vessel or recharging fresh catalyst. The yields were always quantitative based on dinitrile charged.

This example illustrates that when a reactor vessel is charged and dispersed through the same dip tube containing a filter, the incoming stream of liquid removes the retained solid particles from the filter making it possible to use the same catalyst for several runs.

We claim:
1. A system for contacting solid particles with at least two batches of liquid without removing solid particles contained therein comprising, in combination:

an enclosed vessel adapted for holding liquids and solid particles within said vessel;

a conduit extending through the top of said vessel and terminating near the bottom of said vessel below the level of the liquid in said vessel when a reaction is progressing within said vessel;

a first means connected externally of the vessel to said conduit for introducing a liquid into the vessel through said conduit;

a second means connected externally of the vessel to said conduit for withdrawing through said conduit the liquid that has been contacted with solid particles;

filtering means within said conduit for preventing solid particles carried by the liquid from being withdrawn from the vessel, solid particles that are retained by, or embedded in, the filter means when liquid is withdrawn being dislodged therefrom and carried back into the contacting zone of the vessel by the subsequent batch of liquid introduced by the first means;

a second conduit having no filtering means and extending through the top of the vessel and terminating near the bottom of the vessel in order to charge or remove the solid particles therethrough;

a mechanical stirrer extending through the top of the vessel and to such a point near the bottom of the vessel that the liquid may be stirred in order to improve the contact between the liquid and the solid particles; and a passageway extending through the sidewall and above the level of the liquid in said vessel with means to add pressurizing gas to the vessel.

* * * * *